United States Patent
Kasazumi et al.

(10) Patent No.: US 7,677,736 B2
(45) Date of Patent: Mar. 16, 2010

(54) ILLUMINATION LIGHT SOURCE AND TWO-DIMENSIONAL IMAGE DISPLAY USING SAME

(75) Inventors: Ken'ichi Kasazumi, Takatsuki (JP); Kiminori Mizuuchi, Neyagawa (JP); Kazuhisa Yamamoto, Takatsuki (JP)

(73) Assignee: Panasonic Corporation, Osaka (JP)

( * ) Notice: Subject to any disclaimer, the term of this patent is extended or adjusted under 35 U.S.C. 154(b) by 1064 days.

(21) Appl. No.: 10/568,596

(22) PCT Filed: Feb. 24, 2005

(86) PCT No.: PCT/JP2005/002991

§ 371 (c)(1),
(2), (4) Date: Feb. 17, 2006

(87) PCT Pub. No.: WO2005/083493

PCT Pub. Date: Sep. 9, 2005

(65) Prior Publication Data

US 2006/0285078 A1  Dec. 21, 2006

(30) Foreign Application Priority Data

Feb. 27, 2004  (JP) ............................. 2004-054093

(51) Int. Cl.
G02B 26/10 (2006.01)

(52) U.S. Cl. ............ 353/69; 353/98; 359/207.1; 359/208.1; 359/213.1; 359/215.1

(58) Field of Classification Search ............ 353/69, 353/97, 98; 359/197.1, 205.1, 207.1, 207.6, 359/208.1, 208.2, 213.1, 214.1, 215.1, 224.1
See application file for complete search history.

(56) References Cited

U.S. PATENT DOCUMENTS

| 4,108,532 | A | | 8/1978 | Minoura |
| 5,838,480 | A | * | 11/1998 | McIntyre et al. ......... 359/205.1 |
| 7,071,931 | B2 | * | 7/2006 | Tegreene et al. ............ 345/207 |
| 2002/0021346 | A1 | | 2/2002 | Ishihara |
| 2003/0112485 | A1 | * | 6/2003 | Nishihata et al. ............ 359/208 |
| 2004/0100672 | A1 | * | 5/2004 | Yamamoto et al. .......... 359/205 |

(Continued)

FOREIGN PATENT DOCUMENTS

JP  53-33638  3/1978

(Continued)

OTHER PUBLICATIONS

Charles E. Baker et al., "A Large-Screen, Real-Time, Display Technique", Proc. Society for Information Display, 6th Nati'l Symp., pp. 85-101 (1965).

(Continued)

*Primary Examiner*—William C Dowling
(74) *Attorney, Agent, or Firm*—Wenderoth, Lind & Ponack, L.L.P.

(57) ABSTRACT

An illumination light source uses a beam to scan while a relatively small mirror, such as an MEMS mirror, is oscillated at or in the vicinity of the resonance frequency. In this instance, the scan angle is corrected with the use of a correction optical system for uniform illumination to be achieved.

9 Claims, 7 Drawing Sheets

U.S. PATENT DOCUMENTS

2005/0024701 A1* 2/2005 Cannon et al. .............. 359/204
2005/0146764 A1* 7/2005 Deng et al. ................. 359/206

FOREIGN PATENT DOCUMENTS

| JP | 58-211734 | 12/1983 |
|----|-----------|---------|
| JP | 2002-98921 | 4/2002 |
| JP | 2002-344765 | 11/2002 |

OTHER PUBLICATIONS

K. Mizuuchi et al., "Electric-field poling in Mg-doped $LiNbO_3$", Journal of Applied Physics, vol. 96, No. 11, Dec. 1, 2004, pp. 6585-6590.

* cited by examiner

ILLUMINATION LIGHT SOURCE AND TWO-DIMENSIONAL IMAGE DISPLAY USING SAME

BACKGROUND OF THE INVENTION

1. Technical Field

The present invention relates to a video projector using a 2-D spatial light modulation element, such as a liquid crystal panel and a DMD.

2. Background Art

FIG. 7 is a view schematically showing the configuration of a laser display in the related art described in detail, for example, in Non-Patent Document 1. Light beams from laser light sources 100a through c for three colors, RGB, are combined by dichroic mirrors 102a and 102b, and scanned in the horizontal direction (X-direction) by a polygon scanner 104 and in the vertical direction (Y-direction) by a galvanometer scanner 105 to be irradiated onto a screen 108. In this instance, a video is displayed on the screen 108 by modulating intensity by light modulators 106a through 106c according to an input video signal. For example, in order to display a moving image corresponding to an NTSC video signal, about 500 scan lines in the horizontal direction are displayed for 30 frames per second, and the number of horizontal scan lines in total is 15,000 per second. This can be achieved by rotating the polygon scanner 104 having 30 faces at 30,000 rpm. The galvanometer mirror 105 is oscillated to reciprocate in the vertical direction 30 times per second. The resolution in the horizontal direction is determined by a modulation rate of the light modulators with respect to the scan rate. For example, in order to obtain the resolution comparable to 500 TV lines in the horizontal direction at the scan rate specified above, a bandwidth of about 10 MHz is necessary on the basis of 500×15,000=7,500,000. Such a bandwidth can be achieved with a light modulator using the acousto-optic effect or a light modulator using the electro-optic effect.

The display configured in this manner is characterized in that it can display a sharp image having high color purity by using laser light sources having adequate wavelengths because light beams from the respective light sources for RGB are monochromatic light. Sharp color display of each monochromatic light can be achieved, for example, by using a krypton ion laser having a wavelength of 647.1 nm as the red light source, a helium-cadmium laser having a wavelength of 441.6 nm as the blue light source, and a second harmonic of a neodymium-doped YAG laser having a wavelength of 532 nm as the green light source.

The configuration of FIG. 7, however, has a problem that the need to rotate the polygon scanner 104 having 30 faces at 30,000 rpm as described above increases the device in size and also increases noises. In addition, when an incident beam on the polygon scanner 104 is positioned on a boundary line of reflection surfaces, the reflected beam is split into two directions, which makes it impossible to display a video. An image can be therefore displayed only when an incident beam goes incident on any one of the reflection surfaces to fit within. In order to obtain sufficient efficiency for utilization of light, the reflection surfaces of the polygon scanner 104 need to be sufficiently large in comparison with the diameter of the incident beam. Hence, even when the number of reflection surfaces of the polygon scanner 104 is increased, a specific area has to be secured. This increases the polygon scanner 104 in size.

Non-Patent Document 1: Baker et al., "A large screen real-time display technique", *Proc. Society for Information Display* 6th Nati'l Symp., 85-101 (1965)

SUMMARY OF THE INVENTION

The invention therefore has an object to solve these problems and provide a compact, highly silent illumination light source capable of illuminating a screen or the like uniformly, and a 2-D image display device using the same.

In order to achieve the above and other objects, an illumination light source according to one aspect of the invention includes: a coherent light source; beam scan means for scanning light from the coherent light source; and a correction optical system that corrects a scan angle of a beam scanned by the beam scan means, wherein the beam scan means is formed of a mirror portion and mirror portion oscillation means, and the mirror portion is driven by the mirror portion oscillation means at or in a vicinity of a primary resonance frequency of the mirror portion.

According to this aspect, light from the coherent light source can be projected onto a certain wall or the like that functions as a screen. In this instance, the light is scanned on the screen by the beam scan means. The beam scan means can be configured to scan light either one-dimensionally or two-dimensionally. In the case of the configuration to scan the light one-dimensionally, by providing a mechanism that scans the light in a direction orthogonal to the scan direction to the outside, it is possible to display an image, for example, on a 2-D screen.

Also, in a case where the mirror portion provided to the beam scan means is driven, it is difficult to increase the amplitude by a normal driving method; moreover, driving is not stabilized due to an inhomogeneous driving force and air resistance. It is, however, possible to achieve stable driving having sufficiently large amplitude to scan the screen by driving the mirror portion at or in the vicinity of the primary resonance frequency by the mirror portion oscillation means.

However, this alone causes the scan angle at which the mirror portion scans light shows a sinusoidal change over time, which gives rise to a brightness distribution in an image or the like on the screen. In other words, the trajectory of the light are dark in the vicinity of the center of the screen where the scan angle is small due to a high scan rate and the trajectory of the light are bright in the vicinity of the ends where the scan angle is large due to a low scan rate.

Accordingly, the correction optical system makes a correction in such a manner that, for example, the scan rate becomes lower in a region where the scan angle is small and the scan rate becomes higher in a region where the scan angle is large. It is thus possible to achieve a compact, highly silent illumination light source capable of illuminating the screen or the like uniformly.

DETAILED DESCRIPTION OF THE INVENTION

Hereinafter, embodiments of the invention will be described with reference to the drawings.

First Embodiment

One embodiment of the invention will now be described in detail with reference to the drawings.

Figure 1:
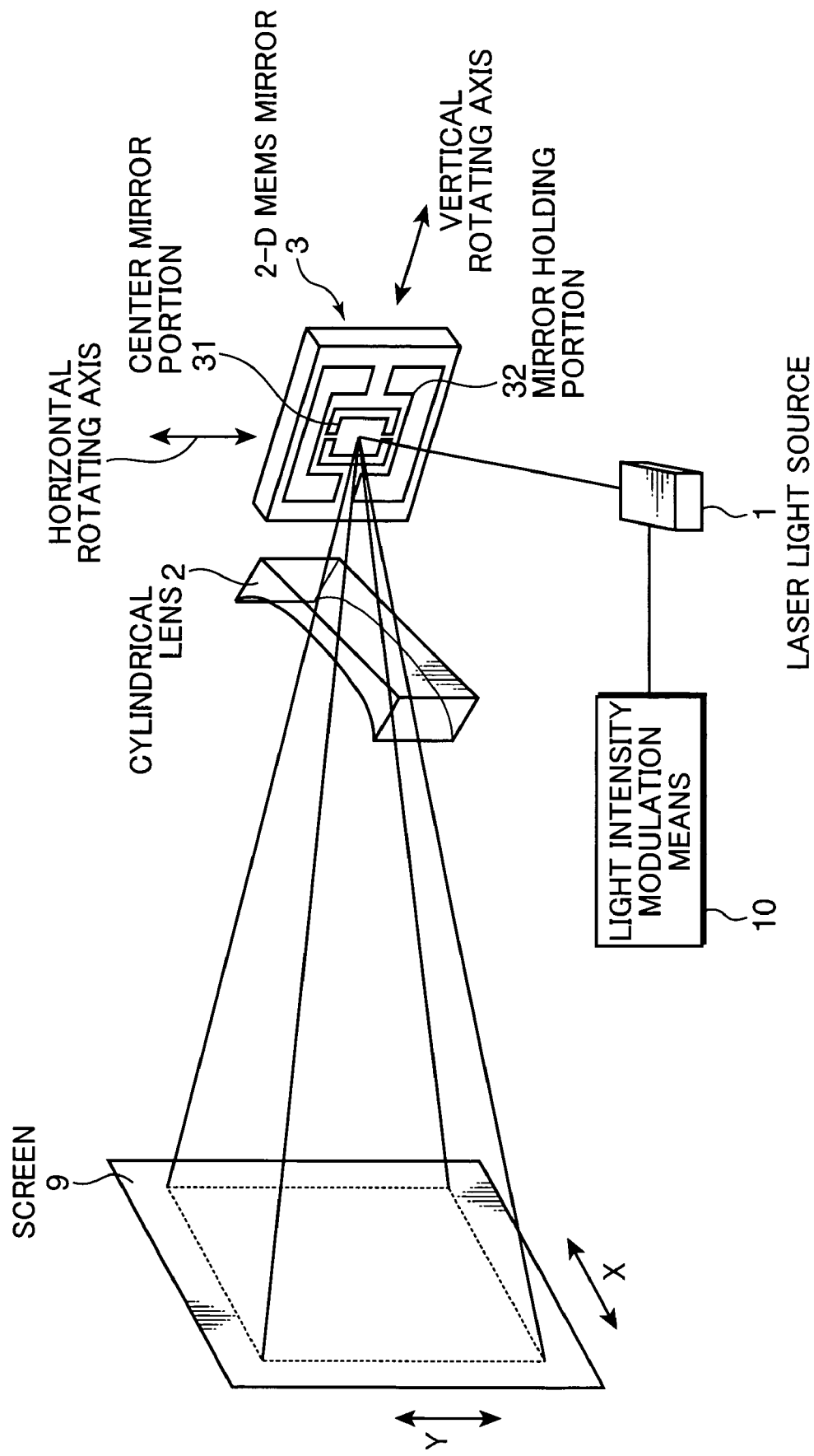
FIG. 1 is a view schematically showing the configuration of a first embodiment of a 2-D image display device of the invention.

FIG. 1 is a view schematically showing the configuration of a 2-D image display device of the invention. Light from a laser light source 1, which is modulated in intensity by light intensity modulation means 10 according to an input video signal, irradiates a 2-D MEMS mirror 3. The 2-D MEMS mirror 3 is a movable mirror made of silicon crystal having a thickness of about 10 μm. It is held at a position afloat from the bottom surface substrate by the etching technique. A center mirror portion 31 is connected to mirror holding portions 32 in the vertical direction by means of beams. Also, the mirror holding portions 32 are supported on beams in the horizontal direction. Under the center mirror portion 31, electrodes partitioned to right and left portions are formed on the bottom surface substrate. By applying a voltage between the center mirror portion 31 and the electrodes on the bottom surface substrate, the center mirror portion 31 tilts in a direction in which the beams are twisted, that is, about the horizontal rotating axis due to an induced electrostatic force.

On the bottom surface substrate corresponding to the mirror holding portions 32, electrodes partitioned to top and bottom portions are formed. By applying a voltage between the mirror holding portions 32 and the electrodes on the bottom surface substrate, the mirror holding portions 32 tilt in a direction in which the beams are twisted, that is, about the vertical rotation axis due to an induced electrostatic force. By controlling the tilts in the both axis directions simultaneously, it is possible to set a tilt of the center mirror portion freely in a two-dimensional direction. The size of the center mirror portion 31 is as small as about 1 mm×1 mm, and the torque is also small. It is therefore possible to increase the primary resonance frequency in the twisted direction with the design of the thickness and width of the beam portion. This makes it easy to obtain a high primary resonance frequency at the center of the rotating axis in the horizontal direction. In this embodiment and second and third embodiments below, the 2-D MEMS mirror 3 is furnished with the function of beam scan means. More specifically, the center mirror portion 31 is furnished with the function of a mirror portion, and the mirror holding portions 32 and the electrodes on the bottom surface substrate or the like are furnished with the function of mirror portion oscillation means.

As has been described, in order to display an NTSC video image, it is necessary to generate 15,000 scan lines per second in the X-direction. Given 1 mm×1 mm as the size of the center mirror portion 31, 50 μm as the width of the beams, and 200 μm as the length of the beams, then the primary resonance frequency was about 15 kHz. Hence, about the right scan frequency needed to display a video signal was obtained. Also, the resonance frequency in the Y-direction was 4 kHz. Because the scan frequency in the Y-direction needed to display a video signal is 30 times per second, the obtained resonance frequency was 100 times or more than 100 times the necessary scan frequency.

Figure 2:
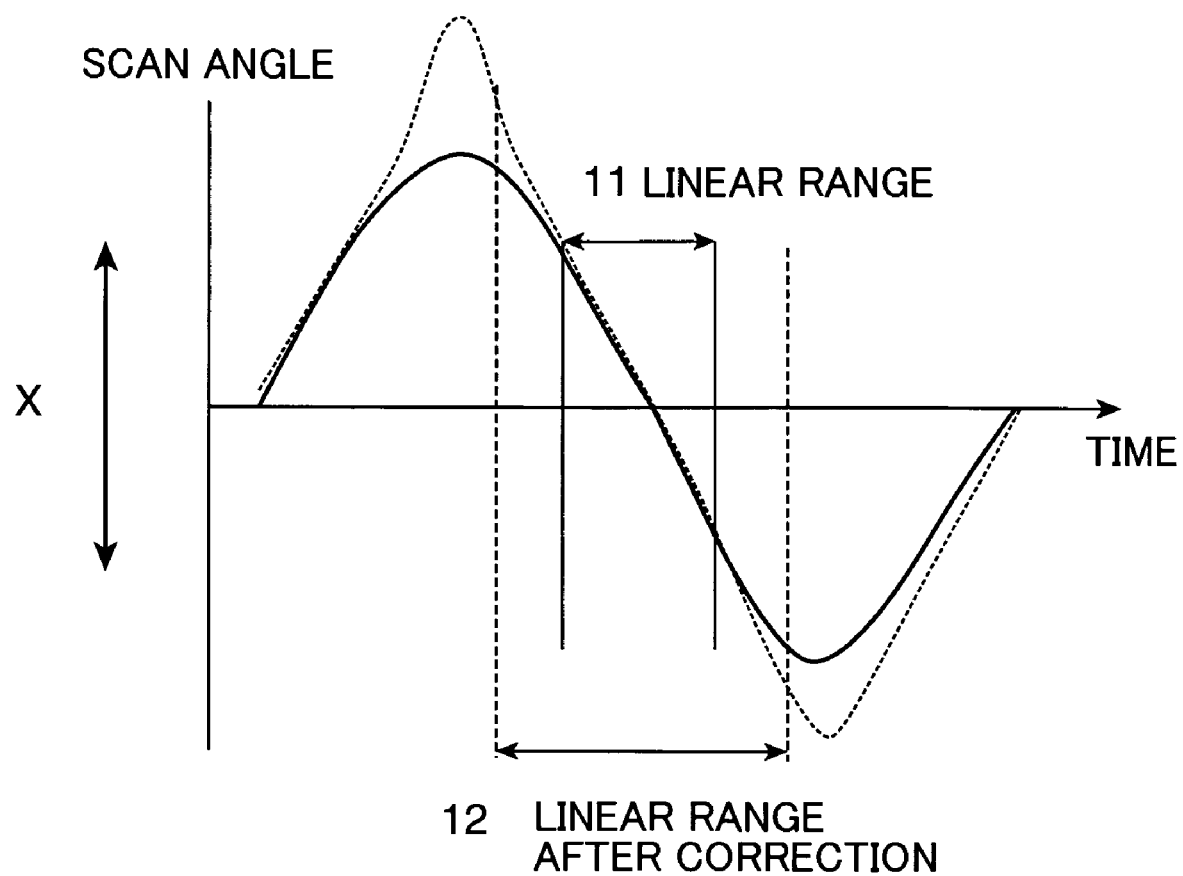
FIG. 2 is a view showing a change of a beam scan angle by beam scan means over time.

In a case where a beam is scanned at a high speed using the MEMS mirror in this manner, because the mirror is driven in the vicinity of the resonance point, the scan angle shows a sinusoidal change over time, which gives rise to a brightness distribution. FIG. 2 is a view showing a change of the scan angle over time. As is shown in the drawing, when the scan angle undergoes a sinusoidal change, the scan rate is almost constant when the scan angle is small, and the scan rate becomes lower with an increase of the scan angle. This raises an inconvenience that when a beam having constant brightness is scanned in a one-dimensional direction in the form of a sinusoidal wave, the trajectory of the beam are dark where the scan angle is small and the trajectory of the beam are bright where the scan angle is large.

In order to solve this problem, the 2-D image display device of the invention uses a beam scan angle correction optical system. To be more concrete, as is shown in FIG. 1, a beam reflected on the MEMS mirror is allowed to go incident on a cylindrical lens (one example of the correction optical system) 2 having a concave surface shape. The curvature of the cylindrical lens 2 is large in the vicinity of the center, that is, in a region where the beam scan angle is small, and small in the peripheral portion, that is, where a beam passes through at a large beam scan angle. In other words, the cylindrical lens 2 has third-order spherical aberration. Hence, when a beam passes through the peripheral portion of the cylindrical lens 2, the scan angle is increased rapidly. It is thus possible to suppress a brightness distribution caused by a difference of the scan rates as described above.

A dotted line in FIG. 2 indicates a change of the scan angle over time when the cylindrical lens 2 is used. As can be understood from the drawing, the scan angle is widened in comparison with the case where no cylindrical lens 2 is used, and a linear range 12 after correction is wider than a linear range 11 (before correction). More specifically, the scan rate, which is a quantity obtained by differentiating a scan angle with respect to a time, belongs to a specific range for a longer time, which makes it possible to control the brightness distribution on the screen to be small.

Figure 3:
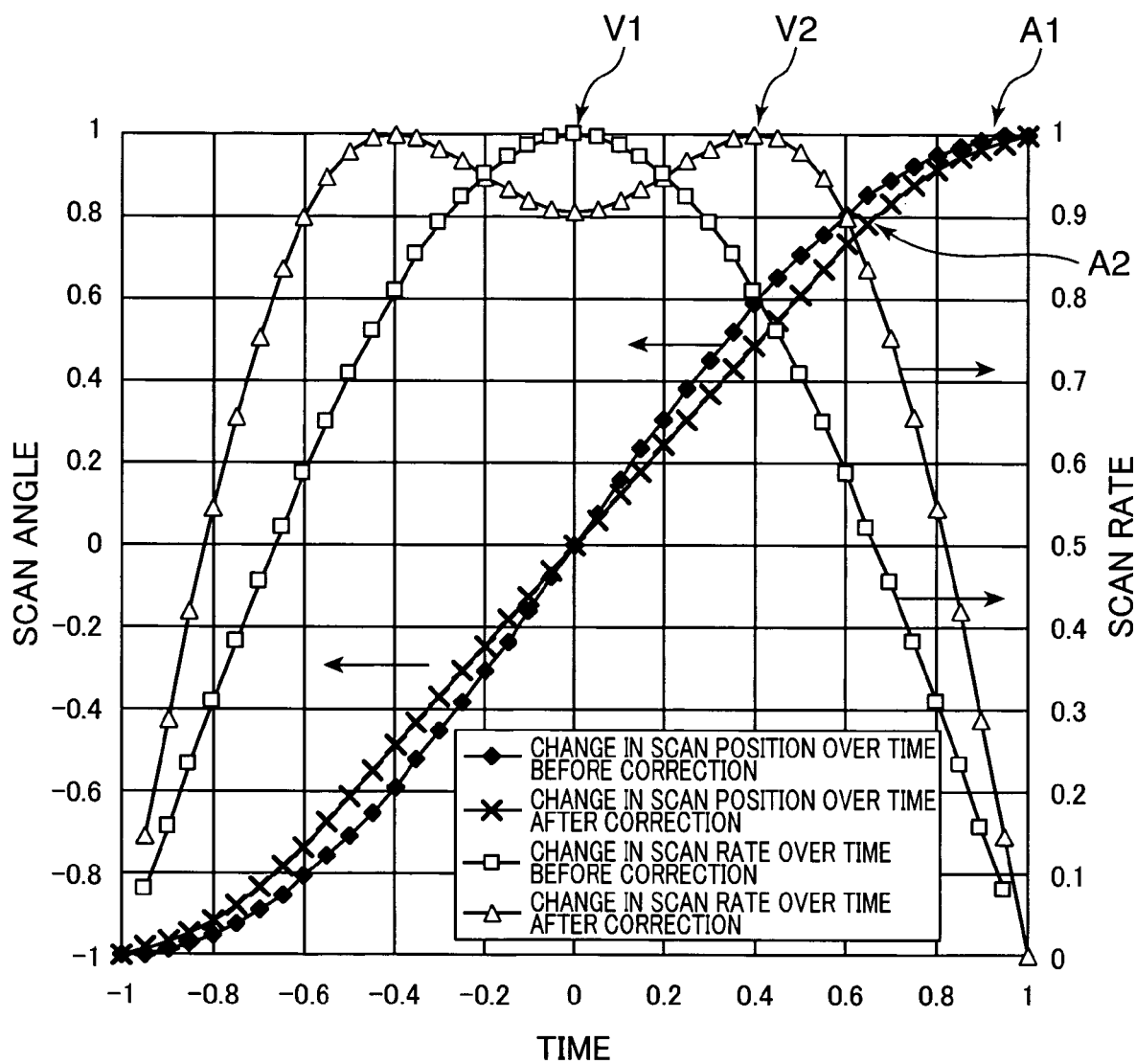
FIG. 3 is a view showing changes of a scan angle and a scan rate over time when a cylindrical lens is used as a correction optical system.

FIG. 3 is a view showing changes of the scan angle and the scan rate over time when the cylindrical lens is used as the correction optical system. Curves V1 and V2 respectively show changes of the scan rate over time before and after the cylindrical lens 2 is used. Also, curves A1 and A2 respectively show changes of the scan angle over time before and after the cylindrical lens 2 is used. The scan angle and the scan rate on the ordinates are standardized in reference to the maximum scan angle and the maximum scan rate, respectively. Also, the time on the abscissa indicates half the time of the resonance cycle, and is standardized in reference to 1 given as a ¼ cycle.

As can be understood from the curve V1 of the drawing, when the cylindrical lens 2 is not used, the scan rate reaches the maximum at a point at which the scan angle is 0 (nil) (when the time is 0 (nil)), and the scan rate decreases with an increase of the scan angle. When the cylindrical lens 2 is used, as is indicated by the curve V2, the scan rate decreases at a point at which the scan angle is 0, and changes to reach the minimal value at this point. Further, in comparison with the case where the cylindrical lens 2 is not used (curve V1), the width expands in the time axis (abscissa) direction. This means that the scan rate belongs to a specific range for a longer time, and it corresponds to an event that the linear range expands with the use of the cylindrical lens 2 as is shown in FIG. 2. This effect is attributed to the fact that the cylindrical lens 2 is a light collection optical system having third-order spherical aberration. As a result, a time during which the scan rate belongs to a specific range accounts for a larger proportion of an operation time. It is thus possible to control the brightness distribution on the screen to be small.

Also, as can be understood from the curve V2 of the drawing, by setting the cylindrical lens 2 so that the scan rate is reduced to the 90% of the maximum value of the scan rate at a point at which the scan angle is 0, irregularities of the scan rate are lessened. Because the brightness on the screen well corresponds to a reciprocal number of the scan rate, a range within which the brightness distribution becomes smaller than a specific value, for example, 25% (a range within which the scan rate is between 0.75 and 1.0 in the drawing) accounts for a larger proportion of the operation time, and accounts for 70% or more of the total. It is preferable that rest of the light that accounts for 30% or less is shielded so as not to reach the screen.

Figure 4:
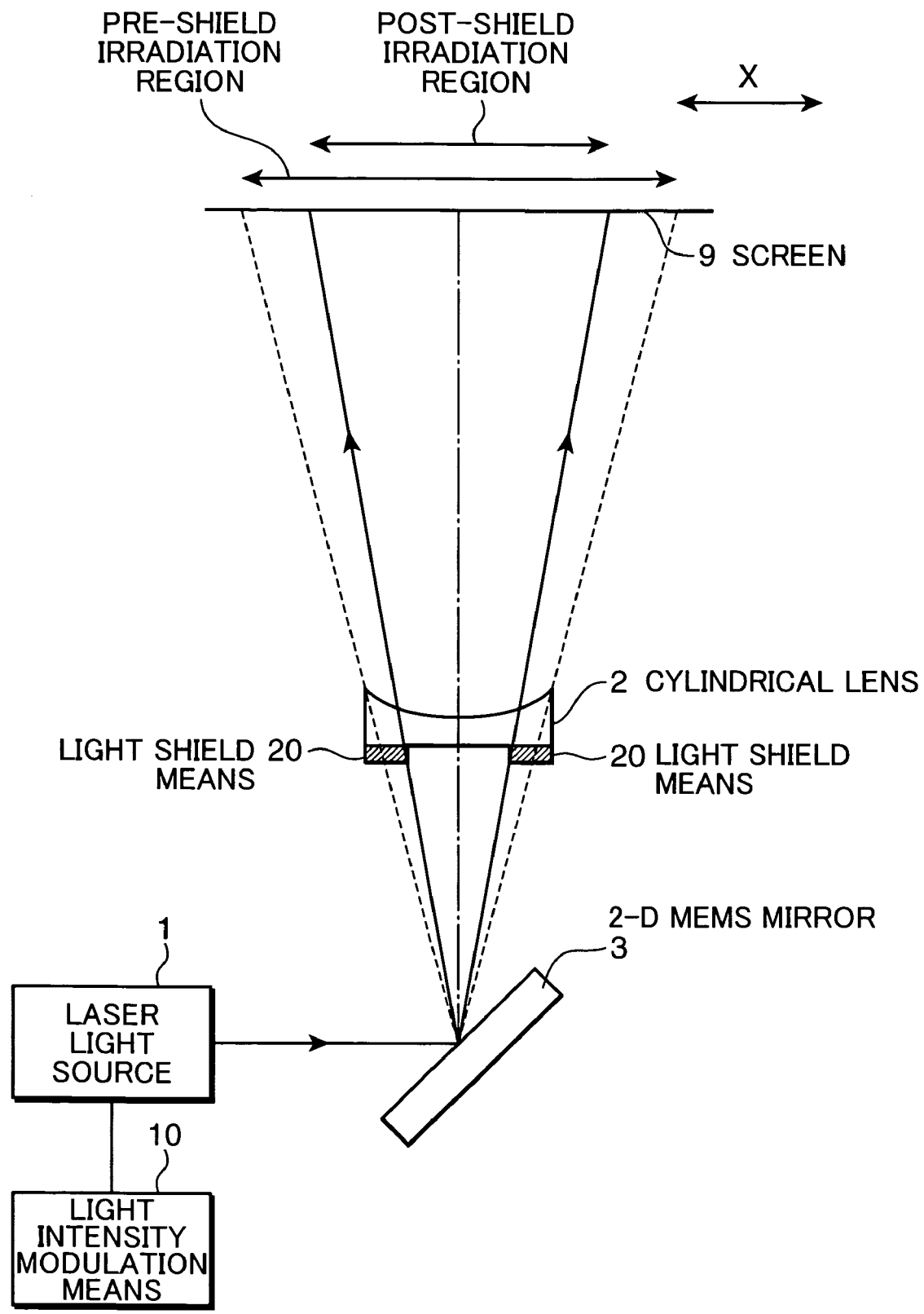
FIG. 4 is a view schematically showing the configuration of one example of light shield means of the invention.

FIG. 4 is a view schematically showing the configuration of one example of light shield means according to the invention. Herein, scan in the X-direction alone will be described. Light reflected on the 2-D MEMS mirror 3 passes through the cylindrical lens 2. In this instance, when the cylindrical lens 2 alone is present, the transmitted light irradiates a specific region (pre-shield irradiation region) on the screen 9. However, as has been described, because the scan rate of light is slow at the end portions of the pre-shield irradiation region in comparison with the vicinity of the center, the end portions are irradiated brighter. This gives rise to a considerable brightness distribution when viewed across the entire screen.

This being the case, this embodiment uses light shield means 20 for shielding light that irradiates the end portions of the pre-shield irradiation region. In this embodiment, it is configured in such a manner that the light shield means 20 is disposed in close adhesion to the cylindrical lens 2 on the 2-D MEMS mirror 3 side. To this end, for example, a plate made of metal or other materials (carbon black or the like) may be disposed in close adhesion to the cylindrical lens 2, or these materials may be directly formed on the surface of the cylindrical lens 2 by means of vapor deposition, sputtering or the like. Further, the light shield means 20 is not necessarily disposed in close adhesion to the cylindrical lens 2, and a plate made of metal or other materials (carbon black or the like) may be disposed in a space between the cylindrical lens 2 and the 2-D MEMS mirror 3 or in a space between the cylindrical lens 2 and the screen 9. In any case, the light shield means 20 effectively shields light that irradiates the end portions of the pre-shield irradiation region. It is thus possible to achieve an illumination light source having a small brightness distribution on the screen and high efficiency for utilization of light.

While the scan in the X-direction has been described, the same applies to the scan in the Y-direction. The description is therefore omitted. Also, it should be appreciated that the light shield means 20 can be used independently in either the X-direction or the Y-direction, or can be used simultaneously in both the X-direction and the Y-direction.

Such a correction of the brightness distribution may be performed by a method by which a quantity of illumination light of the light source is changed for the scan position, that is, a quantity of illumination light of the light source is decreased while light is scanned on the peripheral portion. In this case, however, there is a problem that a light source having a higher output is necessary for an image of the same brightness to be displayed.

The 2-D image display device of the invention is effective when a second harmonic generator device is used as the light source. The second harmonic generator device normally uses a solid-state laser as the light source of a fundamental harmonic. For example, a green laser of 532 nm is produced through wavelength conversion of infrared light of 1064 nm generated from a YAG solid-state laser. However, because the YAG solid-state laser is not able to modulate an output at a high speed, the brightness distribution cannot be suppressed by the method of controlling a quantity of illumination light of the light source for the scan position as described above. On the contrary, the 2-D image display device of the invention is able to control a quantity of illumination light of the light source to be at a constant level, it functions effectively even when a light source that cannot modulate light at a high speed is used.

This embodiment has described an example of the configuration in which a single laser light source is used. However, a full-color 2-D image display device can be constructed by using the configuration in which light beams from plural laser light sources are combined for the combined beam to be scanned.

In the case of the horizontal scan using the polygon scanner used in the related art, light is canned horizontally in a single direction. On the contrary, in the case of the horizontal scan using the mirror of the present application, it is effective to use the scan in the two directions.

Second Embodiment

Figure 5:
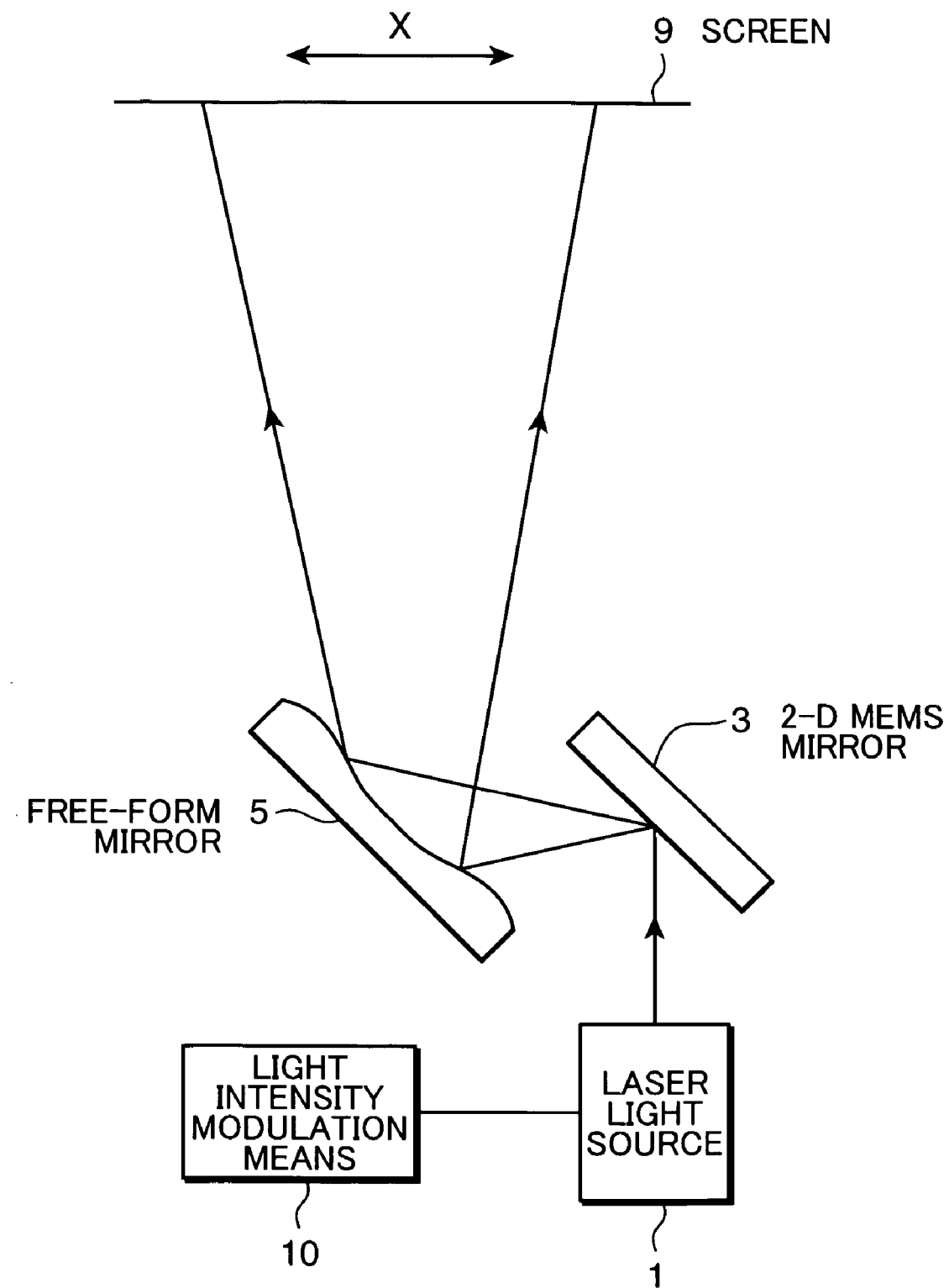
FIG. 5 is a view schematically showing the configuration of a second embodiment of the 2-D image display device of the invention.

FIG. 5 shows another embodiment of the correction optical system used in the invention. FIG. 5 shows the optical configuration of the optical system in FIG. 1 in a direction corresponding to the X-direction. Herein, a free-form mirror (one embodiment of the correction optical system) 5 is used as the scan angle correction optical system. The free-form mirror 5 has a concave surface shape at the center, that is, a region where the beam scan angle is small, and a convex surface shape in the peripheral portion, that is, a region where the beam scan angle is large. The scan angle increases rapidly when a beam passes by the peripheral portion of the free-form mirror 5. It is thus possible to suppress the brightness distribution caused by a difference of the scan rates.

Also, the light shield means as described above can be also provided to the free-form mirror 5. In this case, for example, metal or other materials (carbon black or the like) may be directly formed on the surface of the free-form mirror 5 on the reflection surface side of the free-form mirror 5 by means of vapor deposition, sputtering or the like. Alternatively, the light shield means 20 may be a plate made of the above materials, which is disposed in a space between the free-form mirror 5 and the 2-D MEMS mirror 3, or in a space between the free-form mirror 5 and the screen 9 at a position not to shield an optical path.

Third Embodiment

Figure 6:
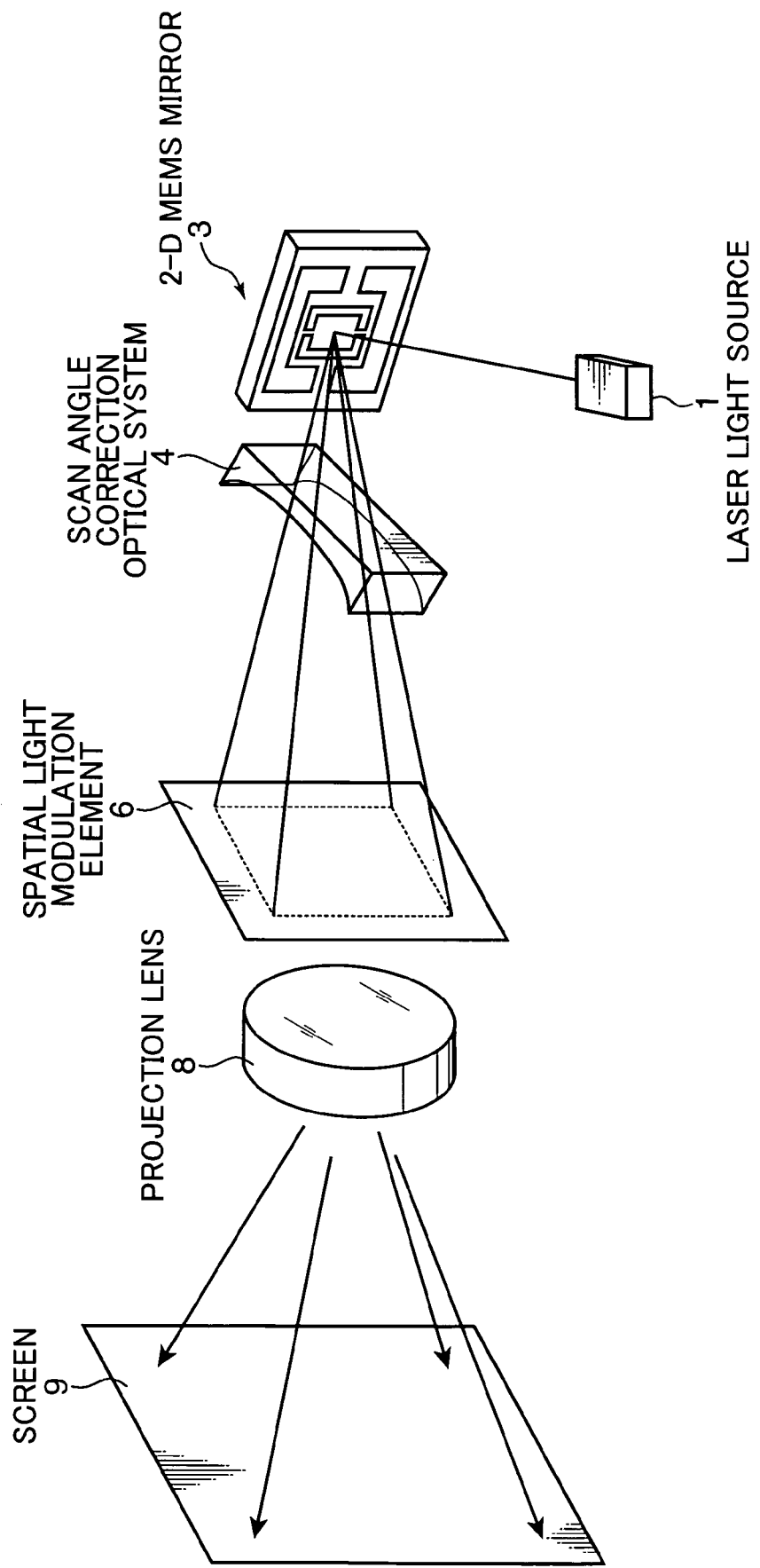
FIG. 6 is a view schematically showing the configuration of a third embodiment of the 2-D image display device of the invention.

FIG. 6 shows one embodiment when a 2-D image display device is constructed from a combination of the illumination light source of the invention and a projection optical system. In the configuration of the second embodiment, an image is formed directly on the screen by scanning light from the laser light source 1 two-dimensionally while modulating the light in intensity. On the contrary, in this embodiment shown in FIG. 6, the laser light source 1 is illuminated at a constant quantity of light, and a spatial light modulation element 6 is illuminated using the 2-D MEMS mirror 3 and a scan angle correction optical system 4. For example, a liquid crystal panel in which optical switches using TN liquid crystal elements are aligned two-dimensionally in multiple arrays is used as the spatial light modulation element 6. The spatial light modulation element 6 is illuminated with a uniform brightness distribution, and a 2-D image formed by passing through the spatial light modulation element 6 is projected onto the screen 9 by a projection lens (projection optical system) 8.

Figure 7:
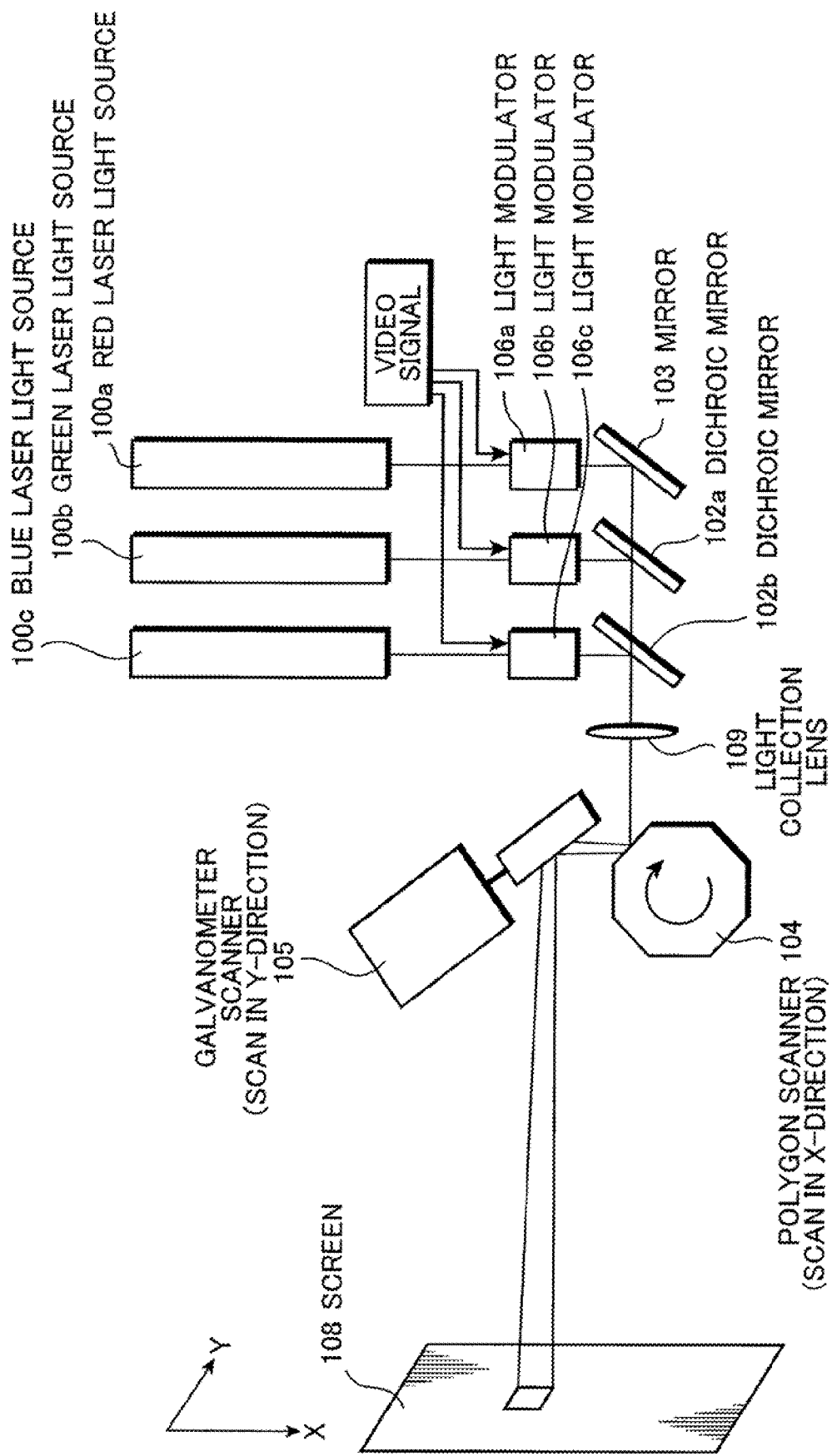
FIG. 7 is a view schematically showing the configuration of a 2-D image display device in the related art.

While it has been described that light from the single laser light source 1 is reflected on the 2-D MEMS mirror 3 in the first through third embodiments above, it is also possible to project a color image by using coherent light sources having adequate wavelengths as respective light sources for RGB (see FIG. 7). In this case, light beams from the coherent light sources for three colors, RGB, are modulated in intensity by light modulators according to an input video signal, and then combined by dichroic mirrors. A single light beam thus combined goes incident on the single 2-D MEMS mirror 3, and is oscillated in a two-dimensional direction. It is thus possible to achieve an illumination light source capable of projecting a sharp color image having high color purity.

Summary Of The Embodiments

Hereinafter, embodiments of the invention will be described briefly.

(1) As has been described, it is preferable that an illumination light source according to the invention of the present application includes: a coherent light source; beam scan means for scanning light from the coherent light source; and a correction optical system that corrects a scan angle of a beam scanned by the beam scan means, wherein the beam scan means is formed of a mirror portion and mirror portion oscillation means, and the mirror portion is driven by the mirror portion oscillation means at or in a vicinity of a primary resonance frequency of the mirror portion.

According to this configuration, light from the coherent light source can be projected onto a certain wall or the like that functions as a screen. In this instance, the light is scanned on the screen by the beam scan means. The beam scan means can be configured to scan light either one-dimensionally or two-dimensionally. In the case of the configuration to scan the light one-dimensionally, by providing a mechanism that scans the light in a direction orthogonal to the scan direction to the outside, it is possible to display an image, for example, on a 2-D screen.

Also, in a case where the mirror portion provided to the beam scan means is driven, it is difficult to increase the amplitude by a normal driving method; moreover, driving is not stabilized due to an inhomogeneous driving force and air resistance. It is, however, possible to achieve stable driving having sufficiently large amplitude to scan the screen by driving the mirror portion at or in the vicinity of the primary resonance frequency by the mirror portion oscillation means.

However, this alone causes the scan angle at which the mirror portion scans light shows a sinusoidal change over time, which gives rise to a brightness distribution in an image or the like on the screen. In other words, the trajectory of the light are dark in the vicinity of the center of the screen where the scan angle is small due to a high scan rate and the trajectory of the light are bright in the vicinity of the ends where the scan angle is large due to a low scan rate.

Accordingly, the correction optical system makes a correction in such a manner that, for example, the scan rate becomes lower in a region where the scan angle is small and the scan rate becomes higher in a region where the scan angle is large. It is thus possible to achieve a compact, highly silent illumination light source capable of illuminating the screen or the like uniformly.

(2) An illumination light source is the illumination light source set forth in (1), wherein it is preferable that the correction optical system is formed of a light collection optical system having third-order spherical aberration. According to this configuration, because the correction optical system has third-order spherical aberration, it is possible to make a correction in such a manner that the scan rate becomes lower in a region where the scan angle is small and the scan rate becomes higher in a region where the scan angle is large. Hence, the scan rate of light scanned by the mirror portion can be maintained at an almost constant level on the screen, which makes it possible to illuminate the screen or the like uniformly. Further, third-order spherical aberration is also produced, for example, by a cylindrical lens whose cross section is part of a circle. The correction optical system furnished with the function described above can be therefore manufactured easily, which can in turn save the manufacturing costs.

(3) An illumination light source is the illumination light source set forth in (1) or (2), wherein it is preferable that the light source further includes light shield means for shielding, of the light from the coherent light source, light whose scan angle by the beam scan means is at a ratio equal to or larger than a specific ratio with respect to a maximum scan angle.

According to this configuration, light in a region in the vicinity of the maximum scan angle where the scan rate is slow is shielded by the light shield means and does not reach the screen. It is thus possible to control a change of the scan rate of light scanned by the mirror portion to be small, which makes it possible to illuminate the screen or the like uniformly. The specific ratio can be set depending on the situation, and for example, it may be set to shield light whose scan angle is at a ratio of 0.9 or higher with respect to the maximum scan angle. In order to suppress a change of the scan rate further, light at a ratio of 0.8 or larger may be shielded. As the value of the ratio becomes smaller, a projection range of light on the screen becomes narrower. However, the projection range can be expanded by increasing a distance from the screen correspondingly.

(4) An illumination light source is the illumination light source set forth in any of (1) through (3), wherein it is preferable that a scan rate of light having passed through the correction optical system takes a minimal value at a point at which the scan angle is 0.

In a case where the correction optical system is not used, the scan rate reaches the maximum at a point at which the scan angle is 0 (nil), and the scan rate becomes lower with an increase of the scan angle. Herein, for example, by using a light collection optical system having third-order spherical aberration, a free-form mirror having a surface shape expressed by a fourth-order function, etc. as the correction optical system, it can be configured in such a manner that the scan rate is low at a point at which the scan angle is 0 and the scan rate takes the minimal value at this point. This allows a scan rate to belong to a specific range for a longer time, and such a time accounts for a larger proportion of the operation time. It is thus possible to control the brightness distribution on the screen to be small.

(5) An illumination light source is the illumination light source set forth in any of (1) through (4), wherein it is preferable that a scan rate of light having passed through the correction optical system is 90% or less of a maximum value of the scan rate at a point at which the scan angle is 0.

According to this configuration, the correction optical system can be set in such a manner that the scan rate at a point at which the scan angle is 0 is reduced to 90% of the maximum value of the scan rate. This lessens the irregularities of the scan rate. Because the brightness on the screen well corresponds to a reciprocal number of the scan rate, a range within which the brightness distribution becomes smaller than a specific value accounts for a larger proportion of the operation time. It is thus possible to achieve an illumination light source having a small brightness distribution on the screen and high efficiency for utilization of light.

(6) An illumination light source is the illumination light source set forth in any of (2) through (5), wherein it is preferable that the light shield means shields the light from the coherent light source for a time that accounts for 30% or less of an operation time. According to this configuration, because 70% of the operation time can be used, it is possible to achieve an illumination light source having high efficiency for utilization of light. In this instance, for example, by using a light collection optical system having third-order spherical aberration as the correction optical system, it is possible to control the brightness distribution on the screen to be as small as 25%.

(7) An illumination light source is the illumination light source set forth in (1), wherein it is preferable that the correction optical system is formed of a free-form mirror. Herein, the free-form mirror has a concave surface shape in the center portion, that is, in a region where the scan angle is small, and a convex surface shape in the peripheral portion, that is, in a region where the scan angle is large. This means, for example, a cross section in a plane produced by incident light on and reflected light from the free-form mirror is a curved surface expressed by a fourth-order function. According to this shape, when light passes by the center portion of the free-form mirror, the scan angle becomes small, and when the light passes by the peripheral portion, the scan angle becomes larger. It is thus possible to achieve an illumination light source capable of illuminating the screen or the like uniformly by suppressing the brightness distribution caused by a difference of the scan rates. Further, because it is easy to manufacture the correction optical system having a cross section expressed by a function of the magnitude of the fourth-order, the manufacturing costs can be saved.

(8) An illumination light source is the illumination light source set forth in any of (1) through (7), wherein it is preferable that the coherent light source is formed of a red coherent light source, a green coherent light source, and a blue coherent light source. According to this configuration, because the coherent light sources of monochromatic light having adequate wavelengths are used as respective light sources for RGB, it is possible to achieve an illumination light source capable of projecting a sharp color image having high color purity.

(9) An illumination light source is the illumination light source set forth in any of 1) through (8), wherein it is preferable that at least the green coherent light source is formed of a second harmonic generator device that generates green light through wavelength conversion of light from the coherent light source having an infrared wavelength. According to this configuration, because at least the green coherent light source is a light source in which the wavelength of light from a coherent light source having an infrared wavelength is converted to half the wavelength, it emits monochromatic light having high color purity as well as high luminance. In addition, the blue coherent light source may be formed of a second harmonic generator device that generates blue light, or a semiconductor laser light source or the like that emits blue light. Meanwhile, it is preferable that the red coherent light source is formed of a semiconductor laser light source or the like that emits red light. By using these light sources, it is possible to achieve an illumination light source capable of projecting a sharp color image.

(10) As has been described, it is preferable that a 2-D image display device according to the invention of the present application includes the illumination light source according to any of claims 1 through 9, and a projection optical system that projects light from the illumination light source onto a screen. According to this configuration, it is possible to achieve a compact, highly silent 2-D image display device capable of displaying an image uniformly on the screen.

While the invention has been described in detail, the description above is illustrative and not restrictive in all aspects. It is therefore understood that a number of modifications that are not described herein can be anticipated without deviating from the scope of the invention.

The 2-D image display device of the invention is able to obtain a uniform illumination light distribution using compact beam scan means consuming less power, and is applicable to a TV receiver, a projection-type data display, a home theater system, a theatrical movie projection device, and a large-screen advertisement display medium. The invention is also applicable to a manufacturing device using the photolithography, such as an aligner for integrated circuit manufacturing.

The invention claimed is:

1. An illumination light source comprising:
a coherent light source;
a beam scan means for scanning light from the coherent light source; and
a correction optical system that corrects a scan angle of a beam scanned by said beam scan means,
wherein said beam scan means is formed of a mirror portion and a mirror portion oscillation means; and the mirror portion is driven by the mirror portion oscillation means at or in a vicinity of a primary resonance frequency of the mirror portion, and
wherein said correction optical system is formed of a light collection optical system having third-order spherical aberration.

2. An illumination light source comprising:
a coherent light source;
a beam scan means for scanning light from the coherent light source; and
a correction optical system that corrects a scan angle of a beam scanned by said beam scan means,
wherein said beam scan means is formed of a mirror portion and a mirror portion oscillation means; and the mirror portion is driven by the mirror portion oscillation means at or in a vicinity of a primary resonance frequency of the mirror portion, and
wherein a light shield means for shielding, of the light from said coherent light source, light whose scan angle by said beam scan means is at a ratio equal to or larger than a specific ratio with respect to a maximum scan angle.

3. An illumination light source comprising:
a coherent light source;
a beam scan means for scanning light from the coherent light source; and
a correction optical system that corrects a scan angle of a beam scanned by said beam scan means,
wherein said beam scan means is formed of a mirror portion and a mirror portion oscillation means; and the mirror portion is driven by the mirror portion oscillation means at or in a vicinity of a primary resonance frequency of the mirror portion, and
wherein a scan rate of light having passed through said correction optical system takes a minimal value at a point at which the scan angle is 0.

4. An illumination light source comprising:
a coherent light source;
a beam scan means for scanning light from the coherent light source; and a correction optical system that corrects a scan angle of a beam scanned by said beam scan means, wherein said beam scan means is formed of a mirror portion and a mirror portion oscillation means; and the mirror portion is driven by the mirror portion oscillation means at or in a vicinity of a primary resonance frequency of the mirror portion, and wherein a scan rate of light having passed through said correction optical system is 90% or less of a maximum value of the scan rate at a point at which the scan angle is 0.

5. The illumination light source according to claim 2, wherein the light shield means shields the light from said coherent light source for a time that accounts for 30% or less of a scan time.

6. The illumination light source according to claim 1, wherein said correction optical system is formed of a free-form mirror.

7. The illumination light source according to claim 1, wherein:
    said coherent light source is formed of a red coherent light source, a green coherent light source, and a blue coherent light source.

8. An illumination light source comprising:

a coherent light source;

a beam scan means for scanning light from the coherent light source; and a correction optical system that corrects a scan angle of a beam scanned by said beam scan means, wherein said beam scan means is formed of a mirror portion and a mirror portion oscillation means; and the mirror portion is driven by the mirror portion oscillation means at or in a vicinity of a primary resonance frequency of the mirror portion, and wherein at least a green coherent light source is formed of a second harmonic generator device that generates green light through wavelength conversion of light from a coherent light source having an infrared wavelength.

9. A 2-D image display device comprising:

the illumination light source according to claim 1; and a projection optical system that projects light from the illumination light source onto a screen.

* * * * *